United States Patent [19]

Cadars

[11] Patent Number: 4,546,797

[45] Date of Patent: Oct. 15, 1985

[54] TURBULATOR FOR A HEAT EXCHANGER COMPRISING A BUNDLE OF TUBES, AND A HEAT EXCHANGER INCLUDING SUCH TURBULATORS

[75] Inventor: Patrick Cadars, Montigny, France

[73] Assignee: Valeo, Paris, France

[21] Appl. No.: 500,081

[22] Filed: Jun. 1, 1983

[30] Foreign Application Priority Data

Jun. 14, 1982 [FR] France ............... 82 10352

[51] Int. Cl.[4] ............... F28F 13/12
[52] U.S. Cl. ............... 138/38; 138/39; 165/109.1; 366/338
[58] Field of Search ........... 165/109 R, 109 T, 174; 366/336, 338; 138/37, 38, 39

[56] References Cited

U.S. PATENT DOCUMENTS

| Re. 1,434 | 3/1863 | Huyler | 366/336 |
| 373,564 | 11/1887 | Meeze | 138/38 |
| 2,070,427 | 2/1937 | Faunce | 165/174 |
| 2,677,394 | 5/1954 | Brinen et al. | 165/109 T X |
| 3,235,003 | 2/1966 | Smith | 165/179 X |
| 4,072,296 | 2/1978 | Doom | 366/337 |
| 4,412,582 | 11/1983 | Mecozzi et al. | 165/76 |

FOREIGN PATENT DOCUMENTS

| 57298 | 7/1912 | Austria | 138/38 |
| 3321456 | 12/1983 | Fed. Rep. of Germany | 165/109 T |
| 2323959 | 8/1977 | France | 165/109 |
| 2044911A | 10/1980 | United Kingdom | 165/109 T |

*Primary Examiner*—Sheldon J. Richter
*Assistant Examiner*—Randolph A. Smith
*Attorney, Agent, or Firm*—Dennison, Meserole, Pollack & Scheiner

[57] ABSTRACT

A one-piece turbulator comprising a rectangular frame with two laterally spaced parallel bars having corresponding ends interconnected by end cross bars, and cross-pieces in the frame. The cross-pieces have a portion extending between the parallel bars, and a further portion projecting perpendicular to a plane defined by the axes of the parallel bars.

14 Claims, 5 Drawing Figures

U.S. Patent  Oct. 15, 1985  4,546,797
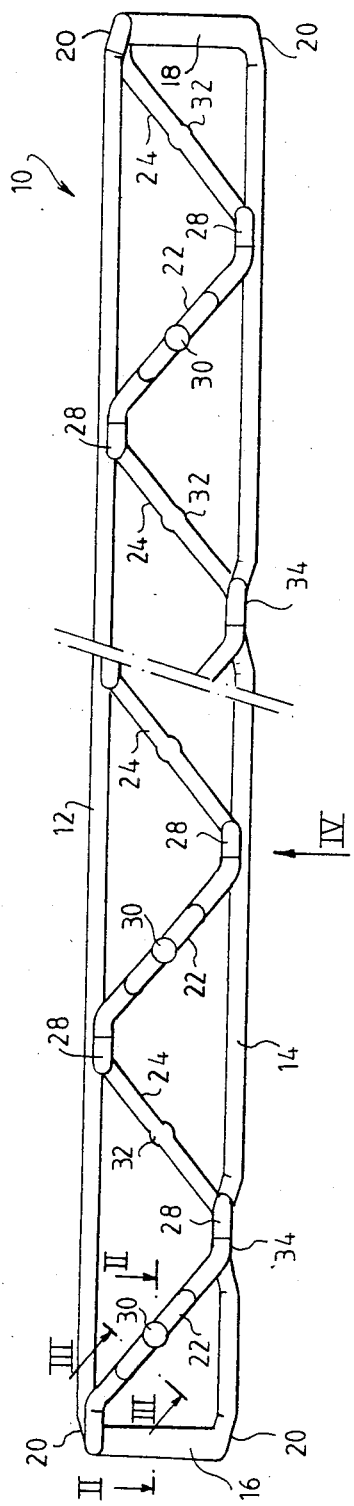
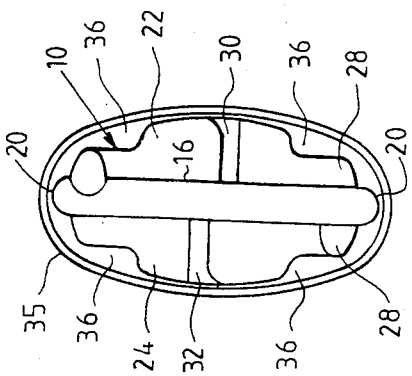
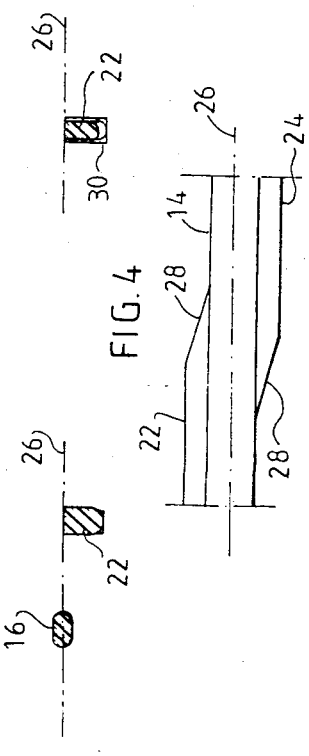

TURBULATOR FOR A HEAT EXCHANGER COMPRISING A BUNDLE OF TUBES, AND A HEAT EXCHANGER INCLUDING SUCH TURBULATORS

The present invention relates to turbulators for placing in fluid circulation tubes in order to increase or to promote the formation of turbulence. It is applicable, in particular, to tubes forming part of a bundle in heat exchangers of the type used in motor vehicles. The invention also relates to heat exchangers including such turbulators.

BACKGROUND OF THE INVENTION

It is already a known practice to place turbulators in the fluid circulation tubes of heat exchangers in order to increase heat exchanger efficiency by forming turbulence in the flow of fluid along the tubes.

Up to now, turbulators have often been in the form of highly elongate, very thin, rectangular strips of ductile material such as aluminum having baffles punched out from the strip and projecting from both faces thereof. However, it to be observed that such turbulators are deformable and difficult to insert into the tubes, in particular when the tubes are of oblong or oval cross section. This is because the turbulator strips are so thin and because of the baffles projecting from both sides thereof.

Preferred embodiments of the present invention mitigate these drawbacks.

SUMMARY OF THE INVENTION

The present invention provides a turbulator suitable for insertion into a fluid circulation tube to increase turbulence in the flow of fluid inside the tube, in particular for insertion into a tube in a bundle of tubes in a heat exchanger for a motor vehicle, the improvement wherein the turbulator comprises two parallel longitudinal bars which are connected to each other by cross-pieces which project perpendicularly from a mid plane defined by the axes of said longitudinal bars and which extend obliquely between the longitudinal bars to form a zig-zag line therebetween.

The two longitudinal edges of the turbulator are two parallel longitudinal bars having cross-pieces extending therebetween, said cross-pieces projecting perpendicularly from a longitudinal mid plane defined by the axes of said longitudinal bars.

Advantageously the turbulator is made as a one-piece injection moulding of plastic material.

Such a turbulator is substantially undeformable in its longitudinal mid plane, and is not very deformable in bending perpendicularly to said plane, whereby it may readily be inserted and slid along the inside of the tube in which it is to be located.

Further, it has no projections from its longitudinal edges in said mid plane since the cross-pieces extend only between said longitudinal bars, thereby further facilitating insertion and positioning inside a tube.

The ends of the longitudinal bars may be interconnected by cross bars extending perpendicularly thereto. This arrangement further facilitates inserting a turbulator into a tube.

The mid portions of the cross-pieces may project further from said longitudinal mid plane than the end portions of the cross-pieces. This ensures good turbulator guidance while it is being inserted into a tube of oval cross section, and also reduces head losses by suitably guiding fluid flow inside the tube.

BRIEF DESCRIPTION OF THE DRAWINGS

An embodiment of the invention is described by way of example with reference to the accompanying drawing, in which:

FIG. 1 is a plan view on an enlarged scale of a turbulator in accordance with the invention;
FIG. 2 is a section along a line II—II in FIG. 1;
FIG. 3 is a section along a line III—III in FIG. 1;
FIG. 4 is a larger scale view of a portion of the turbulator shown in FIG. 1 and looking along an arrow IV; and FIG. 5 is an end view of a turbulator lodged in a tube of oval cross section.

MORE DETAILED DESCRIPTION

The turbulator 10 shown in the drawings is a single piece injection moulding made of a plastic material such as polypropylene which may be impregnated with glass fiber, talc, or other material.

It essentially comprises two longitudinal parallel bars 12 and 14 which are rectilinear and of circular cross section, for example, over substantially their entire length. The longitudinal bars are connected to each other at their ends by two rectilinear cross bars 16 and 18 which may, for example, be of oblong cross section as shown in FIG. 2 with the long axis of the oblong lying parallel to the direction of fluid flow where fluid enters or leaves the tube. The cross bars 16 and 18 are slightly shorter than the distance between the longitudinal bars 12 and 14 and are connected to oblique end portions 20 of said longitudinal bars which serve as a kind of chamfer facilitating insertion of the turbulator into a tube.

The longitudinal bars are also connected to each other by cross-pieces 22 and 24 which extend obliquely between the bars 12 and 14, eg. at an angle of about 45°, and which make up a broken and substantially zig-zag line between the bars.

Relative to a longitudinal mid plane 26 defined by the longitudinal axes of the bars 12 and 14, the cross-pieces project alternately up and down, with the cross-pieces 22 projecting above the plane of FIG. 1 and the cross-pieces 24 projecting below said plane.

The cross-pieces are connected to the longitudinal bars 12 and 14 by end portions 28 which are parallel to the bars and which thus extend at about 135° to the mid parts of the corresponding cross-pieces. The end portions 28 taper smoothly away to a point (see FIG. 4) and they are superposed in pairs on the same longitudinal bar 12 or 14 on either side of the mid plane 26 in such a manner as to facilitate the flow of plastic material when the turbulator is being moulded.

At least some of the cross-pieces, eg. the cross-pieces 22, include respective cylindrical pegs 30 projecting from this mid portions. The peg axes are perpendicular to the mid plane 26 and the pegs are of slightly larger diameter than the thickness of the cross-pieces in the plane of FIG. 1. The pegs facilitate the flow of plastic material from one end to the other of the turbulator during moulding, and in addition, they constitute bearing surfaces to be engaged by ejection fingers when the turbulator is un-moulded.

As shown in FIG. 1, the other cross-pieces 24 may also include analogous cylindrical pegs 32.

At least one of the longitudinal bars, eg. the bar 14, has one or more regions 34 which are stepped in towards the other bar 12. Such regions correspond to points where the plastic material is injected during moulding. Thus, if a sprue is formed at an injection point during turbulator moulding, the sprue does not project beyond the rest of the longitudinal bar 14 and so does not interfere with the turbulator being inserted into a tube.

The middle portions of the cross-pieces 22 and 24 project perpendicularly further from either side of the mid plane 26 than do the end portions of the cross-pieces where they are connected to the longitudinal bars 12 and 14 (FIGS. 3 and 5). The tips of the projecting cross-pieces are convex and slightly rounded.

A turbulator in accordance with the invention is intended, in particular, to be inserted into a straight tube 35 whose cross section may be circular or oblong, eg. oval. The turbulator is placed inside the tube with relatively little play whether between the longitudinal bars 12 and 14 and the inside surface of the tube, or between the tips of the projecting cross-pieces and said inside surface. The projecting tips of the cross pieces are in the middle portions thereof, and they are connected to the end portions of the cross-pieces by smaller portions thereof which leave spaces 36 between the cross-pieces and the inside surface 35 of the tube. These spaces 36 are the preferred passages for fluid flowing along the tube 35. The fluid thus performs a helical motion inside the tube about its longitudinal axis.

The length of the turbulator 10 is less than the length of the tube 35 in which it is inserted.

In general the ends of a tube 35 of oblong cross section are shaped to take up a circular cross section of smaller diameter than the greatest width of the oblong portions of the tube cross section. The cylindrical end portions of the tubes are thus more easily mounted and sealed in the cylindrical holes of circular section through a perforated plate, while at the same time serving as end stops preventing the turbulators from escaping from the tubes. The end cross bars and the oblique portions 20 promote a secure grip between the ends of the turbulators and the tubes.

Because of its rigidity, a turbulator in accordance with the invention is much more easily inserted into a tube than is a prior art turbulator. For the same reason, the flow of fluid along a tube is unlikely to push a turbulator in accordance with the invention out from the tube.

I claim:

1. A turbulator suitable for insertion into a fluid circulation tube to increase turbulence in the flow of fluid inside the tube, in particular in a heat exchanger having a bundle of tubes for a motor vehicle, said turbulator comprising two laterally spaced parallel longitudinal bars, each of said longitudinal bars having ends and axes defining a common longitudinal plane, the corresponding ends of said bars being in general lateral alignment, two end cross bars interconnecting the corresponding ends of the said longitudinal bars to define a rectangular frame, and elongated cross-pieces within said frame, said cross-pieces having a portion extending between and terminating at the said two longitudinal bars, said cross pieces having a further portion projecting perpendicularly from a longitudinal plane defined by the axes of the said two longitudinal bars, said turbulator, including said longitudinal bars, cross bars and cross-pieces, being of onepiece construction.

2. A turbulator according to claim 1 wherein said longitudinal bars and said end cross bars define an uninterrupted external periphery about said frame.

3. A turbulator according to claim 2 wherein the end cross bars are slightly shorter than the distance between the longitudinal bars, said longitudinal bars having inwardly sloping end portions to which the cross bars are connected, whereby the frame has opposed ends having a transverse width less than that of at least a major portion of the frame therebetween.

4. A turbulator according to claim 2 wherein said frame surrounds an open area interrupted solely by said cross-pieces.

5. A turbulator according to claim 2 wherein said cross-pieces terminate in laterally turned end portions which overlie the sides of the longitudinal bars and extend parallel thereto.

6. A turbulator according to claim 5 wherein the cross-pieces extend obliquely between the longitudinal bars to form a zig-zag line therebetween, one end portion of each of said cross-pieces overlying a corresponding end portion of an adjacent cross-piece on the opposite side of the corresponding longitudinal bar.

7. A turbulator according to claim 6 wherein each of said end portions tapers toward the corresponding longitudinal bar.

8. A turbulator according to claim 1, wherein the cross-pieces extend obliquely between the longitudinal bars to form a zig-zag line therebetween.

9. A turbulator according to claim 1, wherein successive cross-pieces project alternately from each side of the said longitudinal mid plane of the turbulator.

10. A turbulator according to claim 1, wherein the middles of the cross-pieces project further from said longitudinal mid plane than do the ends of the cross-pieces.

11. A turbulator according to claim 1, wherein the end cross bars are of elongated cross section, with the longest dimension of the cross section being parallel to said longitudinal bars.

12. A turbulator according to claim 1, wherein the end cross bars are slightly shorter than the distance between the longitudinal bars and wherein said longitudinal bars have inwardly sloping end portions to which the cross bars are connected.

13. A turbulator according to claim 1, wherein the turbulator is an injection moulding of plastic material.

14. A turbulator according to claim 13, wherein one of the longitudinal bars has at least one region which is inwardly offset towards the other longitudinal bar.

* * * * *